DATA INPUT-OUTPUT CONTROL MECHANISM

Filed Sept. 20, 1956 7 Sheets-Sheet 1

INVENTOR.
CARL D. SOUTHARD
BY Charles [signature]
AGENT

April 10, 1962 C. D. SOUTHARD 3,029,412

DATA INPUT-OUTPUT CONTROL MECHANISM

Filed Sept. 20, 1956 7 Sheets-Sheet 2

April 10, 1962 C. D. SOUTHARD 3,029,412

DATA INPUT-OUTPUT CONTROL MECHANISM

Filed Sept. 20, 1956 7 Sheets-Sheet 5

United States Patent Office 3,029,412

Patented Apr. 10, 1962

3,029,412

DATA INPUT-OUTPUT CONTROL MECHANISM

Carl D. Southard, Endicott, N.Y., assignor to International Business Machines Corporation, New York, N.Y., a corporation of New York Filed Sept. 20, 1956, Ser. No. 611,029
10 Claims. (Cl. 340—172.5)

This invention relates to data input-output control mechanism and more particularly to the circuitry and controls for transferring data into and out of a high-speed data processing system.

Many high-speed data processing systems utilize a rotating magnetic drum as the storage medium for information that is to be or has been processed by the system. Storage devices of this type are characterized by a large storage capacity and rapid access to the data stored therein. Prior to the processing operations it is necessary to introduce the data which is to be processed into the high-speed storage device and after processing to record the results in other storage media such as punched cards or in printed form on record sheets.

Presently available mechanisms for reading data into the processing systems and for recording out of the systems are limited in the speed of operation. Furthermore, many of these mechanisms are of the single address type which are capable of performing either a read or record operation individually but not both operations concurrently.

It is therefore desirable that the data input transfer and data output transfer operations be capable of being performed either individually or concurrently on a selective basis and that processing within the data processing system be permitted to continue while data is being transferred into or out of the processing system. Additionally, it would be advantageous to provide a mechanism that would enable the source data to be read into the data processing system and processed followed by the recording of the results of the processing in the same storage medium with the source data.

It is a prime object of this invention to provide improved data transfer and control mechanism for such a machine.

Another object is to provide improved control mechanism for effecting data transfers between a slow operating input-output device and a high-speed data processing machine.

Another object is to provide improved control mechanism which enables concurrent input and output data transfer operations between a slow operating input-output device and a high-speed data processing machine.

Still another object is to provide improved data transfer control mechanism for effecting data transfers to and from a high-speed data processing machine without the interruption of data processing operations within the machine.

According to the embodiment of the invention disclosed herein, a data processing machine is provided with a revolvable magnetic drum for storing data as magnetic spots on its surface. The surface of the drum is longitudinally divided into a plurality of bands. One of the bands functions as a buffer storage unit and the remaining bands function as a general storage unit. A section of the buffer storage band is adapted to receive data from a relatively slow operating data source for subsequent transfer to the general storage unit. The transfer of data from buffer storage to general storage occurs within a fraction of a revolution of the drum storage device.

Processed data which is stored in the general storage unit may be transferred to a second section of the buffer storage band within a fraction of a revolution of the drum storage device. The second section of the buffer storage band is adapted to store data for the read-out transfer to a relatively slow operating recording device, as for example, a card punch or the like for recording the data in another storage medium. The data transfer system and controls disclosed herein enable a data input transfer to the first section of the buffer and a data output transfer from the second section of the buffer to be performed either individually or concurrently on a selective basis. Furthermore, the processing functions are permitted to continue in the data processing machine while the above-mentioned input and output transfers of data are taking place.

Other objects of the invention will be pointed out in the following description and claims and illustrated in the accompanying drawings, which disclose, by way of examples, the principle of the invention and the best mode, which has been contemplated, of applying that principle.

FIGS. *4a* and *4b* constitute the control circuits for the data transfer system.

FIGS. *5a* and *5b* constitute a timing chart for the input-output device.

Figure 6:
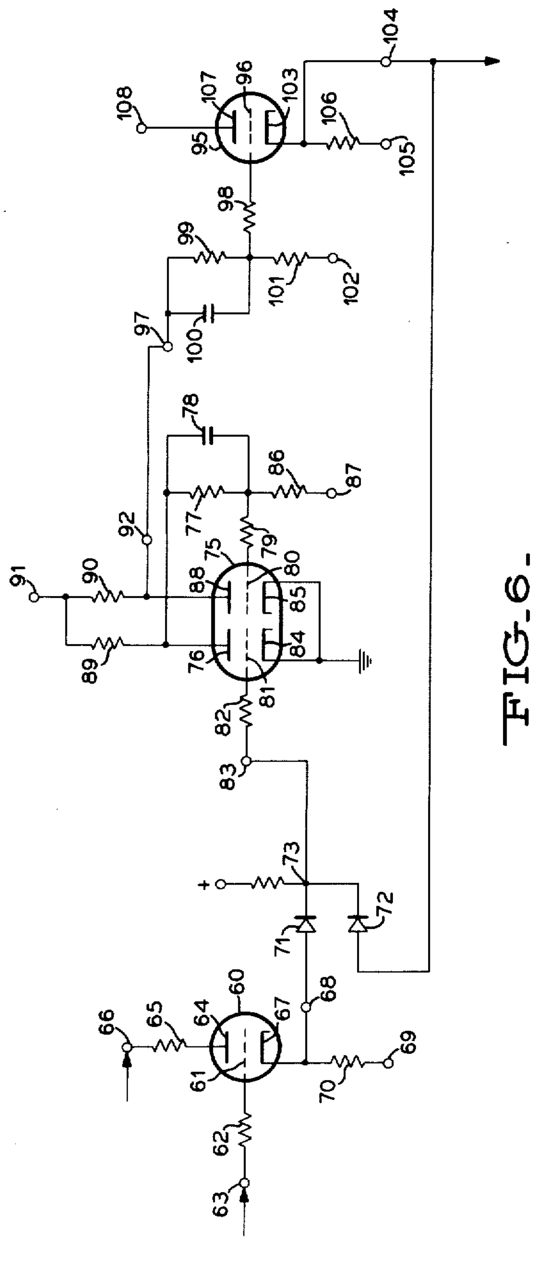

FIG. 6 is a schematic representation of circuit elements which are used in the control circuits for the data transfer system.

Figure 7:
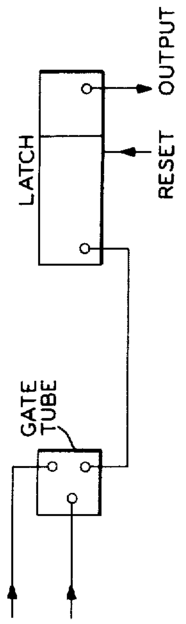

FIG. 7 is a block diagram representation of the circuit elements shown in FIG. 6.

GENERAL DESCRIPTION

The instant invention concerns the controls for the transfer of data from static storage means, such as a record card, to a cyclically moving magnetic storage device, such as a magnetic drum, and conversely, the transfer of data from a cyclically moving magnetic storage device to a static storage medium. In the static storage means the data are represented by designations in columns and rows, the different columns being assigned to different character denominations, and the row positions of the designations either singly or combinationally serving to identify the character.

Figure 1:
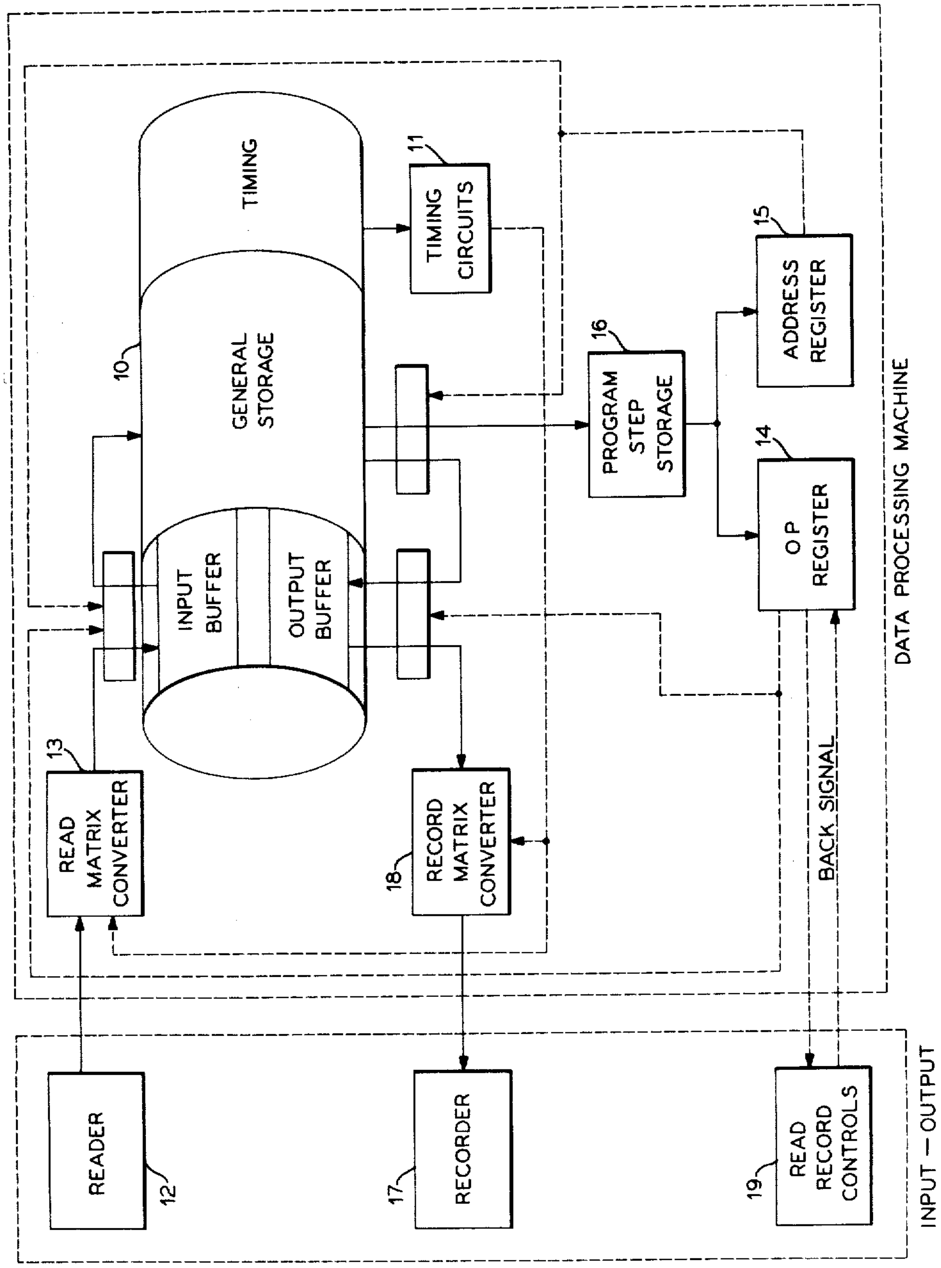
FIG. 1 is a general flow diagram of a data transfer system which utilizes an arrangement of controls in accordance with the principles of the invention.

In FIG. 1 there is shown schematically a data input-output device and the data transfer mechanism adapted for connecting the input-output device with a high-speed data processing machine of the type that utilizes a rotating drum 10 for data storing purposes. The drum 10 is longitudinally divided into sections designated as buffer storage, general storage and timing. The buffer storage section includes two portions designated as input buffer and output buffer which serve functionally as interim storage units. The general storage section, as the name implies, has the function of a general storage unit. The general storage and buffer storage sections of the drum 10 each comprise a plurality of tracks defined on the surface of the drum and extending circumferentially about the drum. A reading and recording device is associated with each of the tracks and may be a combinational magnetic head having both a reading and recording coil wound thereon.

The timing section of the magnetic drum 10 is schematically indicated in FIG. 1. This section constitutes several tracks having permanently recorded spots which serve to generate signals that are used to control a plurality of timing circuits represented by the block 11. The timing circuits produce various timing pulses in accordance with techniques that are well known in the art. These timing pulses are cyclically supplied to the data transfer circuits for controlling various timing and switching functions in relation to the rotation of the storage drum.

In the particular embodiment there is an input-output device, as indicated in FIG. 1. The reader 12 component of the input-output device has the function of sensing cards of the well-known "IBM" punched record card type and to generate electrical pulses representative of the data sensed. The data representing signals are transferred to the input buffer through the read matrix-converter 13. This transfer involves the reconciliation of the arrangement of the data designations on the card in order to provide a sequential arrangement of the character recordings in the input buffer portion of the magnetic storage device 10.

The reconciliation is accomplished by assigning a different revolution of the magnetic storage device to each different kind of character. The data is recorded in the input buffer as it is read out of the static storage means. During any one revolution of the magnetic storage device, all like-characters are read out in a sequence determined by the columnar position of the characters in the static storage means. The transfer of data during successive revolutions of the magnetic storage device involves the interspersion of the magnetic recordings during the successive cycles of the magnetic storage device 10. It is in this manner that a data transfer to a high-speed storage device from a relatively slow operating reader device is effected.

Preparatory to the transfer of data from the reader 12 to the input buffer portion of the drum 10, the data transfer signal produced by the O*p* (operation) registrater 14 of the program controls causes data previously stored in the input buffer to be transferred to one of the numerous locations in the general storage section of the drum 10 that is selected under control of the address register 15 of the program controls. The data from the input buffer is transferred and magnetically recorded in the selected location in the general storage section within one revolution of the drum storage device 10.

After the completion of the transfer of data from the input buffer to general storage, the data representing signals from the reader 12 are transferred via the reader matrix-converter 13 and magnetically stored in the input buffer. Preparatory to the entry of each additional data group from the reader 12, the data group stored in the input buffer must be transferred to general storage in the same manner as explained above.

The data stored in the general storage section of drum 10 may be utilized in various ways. For example, the data may be introduced into the program step storage device 16 a data group at a time to control the programmed operations of the data processing machine, or it may be utilized in processing operations within the arithmetical components (not shown) of the processing machine. Generally after the processing operations the new data produced in the arithmetical components will be introduced into the general storage section of drum 10.

Processed data stored in the general storage section of drum 10 may be transferred to another storage medium such as an "IBM" record card. Herein the data is transferred from general storage to the output buffer portion prior to its transfer to the recording device. The recorder 17 component of the input-output device has the function of responding to data representing signals transferred from the output buffer via the record matrix converter 18 to set up and control the recording mechanism so as to effect a data recording operation to thereby store the data from the data processing machine in a record.

Generally, in systems of this type the data input and output transfers are initiated by programmed control signals from within the data processing machine. As indicated in FIG. 1, the operations signals produced in the *op* register 14 serve to activate the read-record controls 19.

In the preferred embodiment there is provided reading and recording mechanism with associated control mechanism to permit selective reading or recording operations and concurrent reading and recording operations. An additional feature of the input-output device is the provision of improved mechanism and controls which enable source data to be read from a record, processed and the results data to be recorded in the same record from which the source data was read.

Inasmuch as the invention claimed herein pertains mainly to the control mechanism for controlling the transfers of data from a source record to buffer storage, and conversely, the transfers of data from a buffer storage device to other storage media, the other portions of the data processing system to which reference has just been made are disclosed only to the extent necessary for an understanding of the claimed invention.

*Input-Output Device*

Figure 2:
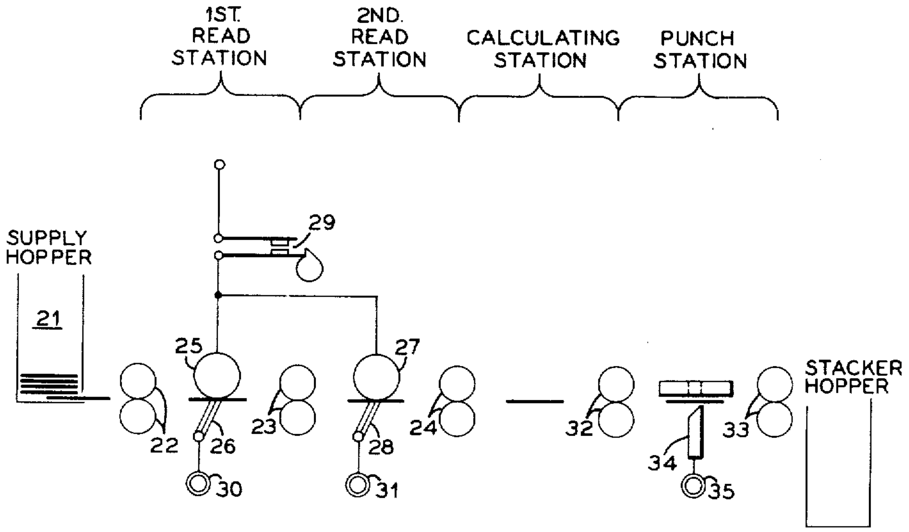
FIG. 2 is a schematic representation of the input-output device.

Reference is now made to FIG. 2, which schematically shows a representative embodiment of a card reading and recording apparatus adapted for use in conjunction with a high-speed data processing machine. The input-output device comprises a card supply hopper, a card transport, a card stacker hopper, a first read station, a second read station, a calculation station, and a punch station. The input-output device has the functions of transporting record cards, sensing the record cards to initiate electrical pulses corresponding to the data sensed for transfer to a storage medium, and selectively perforating record cards in response to electrical signals received from a storage medium and representative of the data which is to be recorded in the record card.

Figure 3:
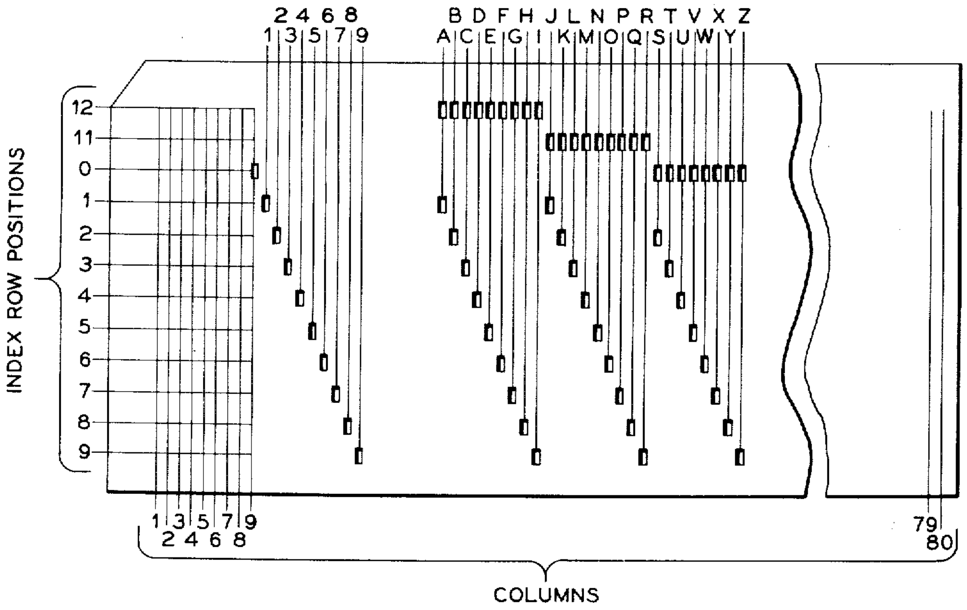
FIG. 3 shows a diagrammatic arrangement of the well-known IBM record card.

The record cards of the well-known "IBM" type shown in FIG. 3 is subdivided into vertical columns and horizontal rows, or index point positions. The vertical columns may be grouped into fields and within each field the columns pertain to different denominational orders. Data is recorded in the cards by selectively punched holes in index positions of the columns of the card. The numbers 0 to 9 are designated by single perforations in corresponding index positions of the columns, only one perforation being made in any one column. The index positions 1 to 9 are known as the numeric positions. The index positions 12, 11 and 0 are known as the zone positions. Alphabetic characters are designated by a perforation in a zone position combined with a perforation in a numeric position. Thus, it may be seen that the numeric perforations may occur alone or in combination with zone perforations. Also, the 0 perforation may occur alone or in combination. As indicated by FIG. 3, a perforation in the 12 index position combined with a perforation in one of the positions 1 to 9 represents one of the letters A to I. An "11" hole combined with one of the perforations in positions 1 to 9 represents one of the letters J to R. A "0" hole combined with a perforation in one of the positions 2 to 9 represents one of the letters S to Z.

The card transport and card reading stations of the input-output device is similar in its general construction and operation to the card stacker hopper, card feeder, and the first and second read stations of the apparatus shown in FIG. 3 of U.S. Patent No. Re. 21,133, issued to C. D. Lake, and described therein. The card transport of the input-output device continues through a station designated as the calculate station and then through a punch station. The punch station is similar in its general construction and operation to the card punch station of the apparatus shown in FIG. 3 of the above-cited patent issued to C. D. Lake and described therein. The adaptation of the various stations to the single card transport apparatus is within the abilities of persons skilled in the art.

A stack of the well-known "IBM" record cards (FIG. 3) is diagrammatically shown in the supply hopper 21

(FIG. 2). When a card feed cycle is initiated a card picker (not shown) feeds one card at a time from the bottom of the stack to a first pair of feed rolls 22. The feed rolls 22 feed the card continuously through the first read station to a second pair of feed rolls 23. On the succeeding card feed cycle, the feed rolls 23 feed the card continuously through the second read station to a third pair of feed rolls 24, while another card is fed from the stacker 21 through the feed rolls 22 to the second pair of feed rolls 23.

The first read station comprises a common contact roll 25 and a row of conductive sensing brushes 26, one for each column of the record card. The second read station has a similar contact roll 27 and a similar row of sensing brushes 28. Each brush is adapted to sense one card column and to engage through a hole in a column with the common contact roll as the card passes through the read station. The potential supply to the common contact rolls 25 and 27 is controlled by the cam contacts 29. The card feed means is driven from a continually rotating shaft through releasable clutch means that may be selectively and intermittently engaged for the purpose of individually feeding cards continuously through each of the reading stations.

Each of the sensing brushes 26 in the first read station is directly connected to its respective plug hub 30. Each of the sensing brushes 28 in the second read station is directly connected to its respective plug hub 31. These plug hubs are part of a plug board which is a component part of the input-output device. The plug board provides a flexible and convenient means for selectively making electrical connections with the data transfer circuitry which is connected with the data processing machine.

The purpose of the first read station is normally to sense the record cards to determine if the information contained in the card is alphabetic or numeric. According to the determination made in the first read station, a control condition is established for the reading of the card in the second read station. In the second read station the information is read for transfer to and recording on the magnetic drum storage device within the data processing machine. The circuit details and operations for transferring data from a card reading device to a high-speed magnetic drum storage device are illustrated and described in the application for Data Transfer Apparatus, Seral No. 556,598, filed December 30, 1955.

The calculate station is intermediate to the second read station and the punch station. A single card feed cycle is required to pass the record card from feed rolls 24 through the calculate station to the pair of feed rolls 32. The function of the calculate station is to provide data processing time that will enable result data to be punched into the same card from which the source data was read during a succeeding card feed cycle. Furthermore, the calculate station provides time for a comparison on an optional basis of source data from the card in the calculate station or result data produced therefrom with data read from a card in the second read station prior to a punching operation. This will become more fully apparent as the description proceeds.

The fourth pair of feed rolls 32 serve to feed the card through the punch station to a fifth pair of feed rolls 33. The punch station comprises a plurality of punching devices 34 and includes a punch control magnet for each of the punching devices, one for each column of the record card, arranged in a single line.

The cards are intermittently moved past the line of punching devices 34. At the time the card is being intermittently moved through the punch station, data representing signals received through plug hubs 35 selectively energize the punch magnets for controlling a related punch to effect data punching operations.

The cards in passing through the punch station pause momentarily at each index point position so that if a perforation is to be made, the punching device has time to penetrate and withdraw from the card. The cards are moved past the line of punching devices 34 so that the horizontal rows of index positions are successively aligned with the single row of punching devices. In other words, all "12's" are simultaneously punched in the card and then all "11's" are simultaneously punched, and so on through the "9" index position. This punching operation involves the interspersion of columnar perforations. In order to satisfy the operating conditions of the punch station, it necessary to read out all "12's" from the drum storage device and punch them in the card. This is followed by the readout and punching of all "11's" and so on. This type of operation requires a different revolution of the drum storage device for the readout of each different kind of character. The circuit details for transferring alphabetic and numeric character signal representations from a revolving magnetic storage drum to a card perforating device are shown and described in the application for Data Transfer Apparatus, Serial No. 556,-598, filed December 30, 1955.

The feed rolls 33 serve to advance the card from the card transport mechanism into the stacker hopper 36.

*Read-Punch Controls*

Figure 4A:
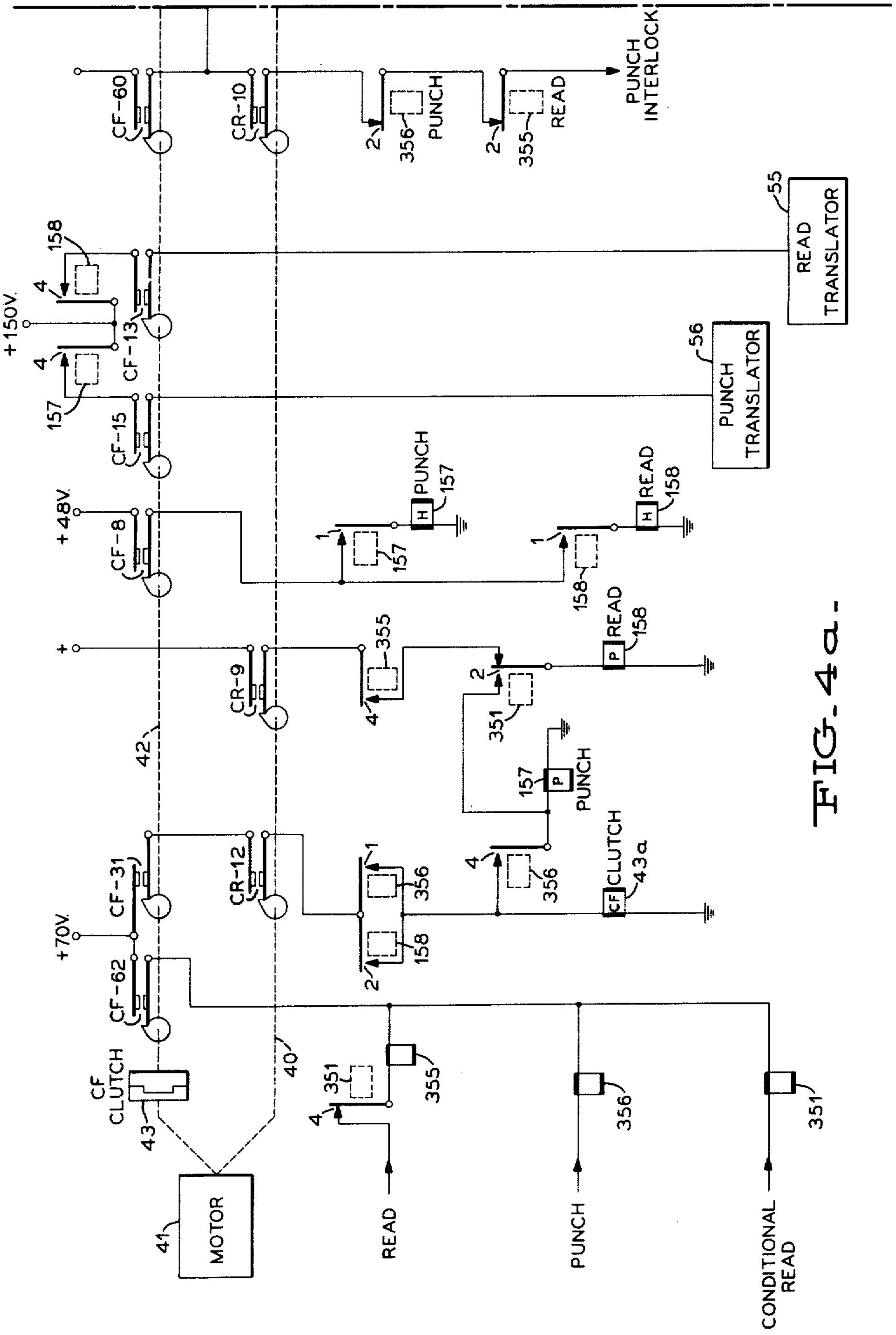
Figure 4B:
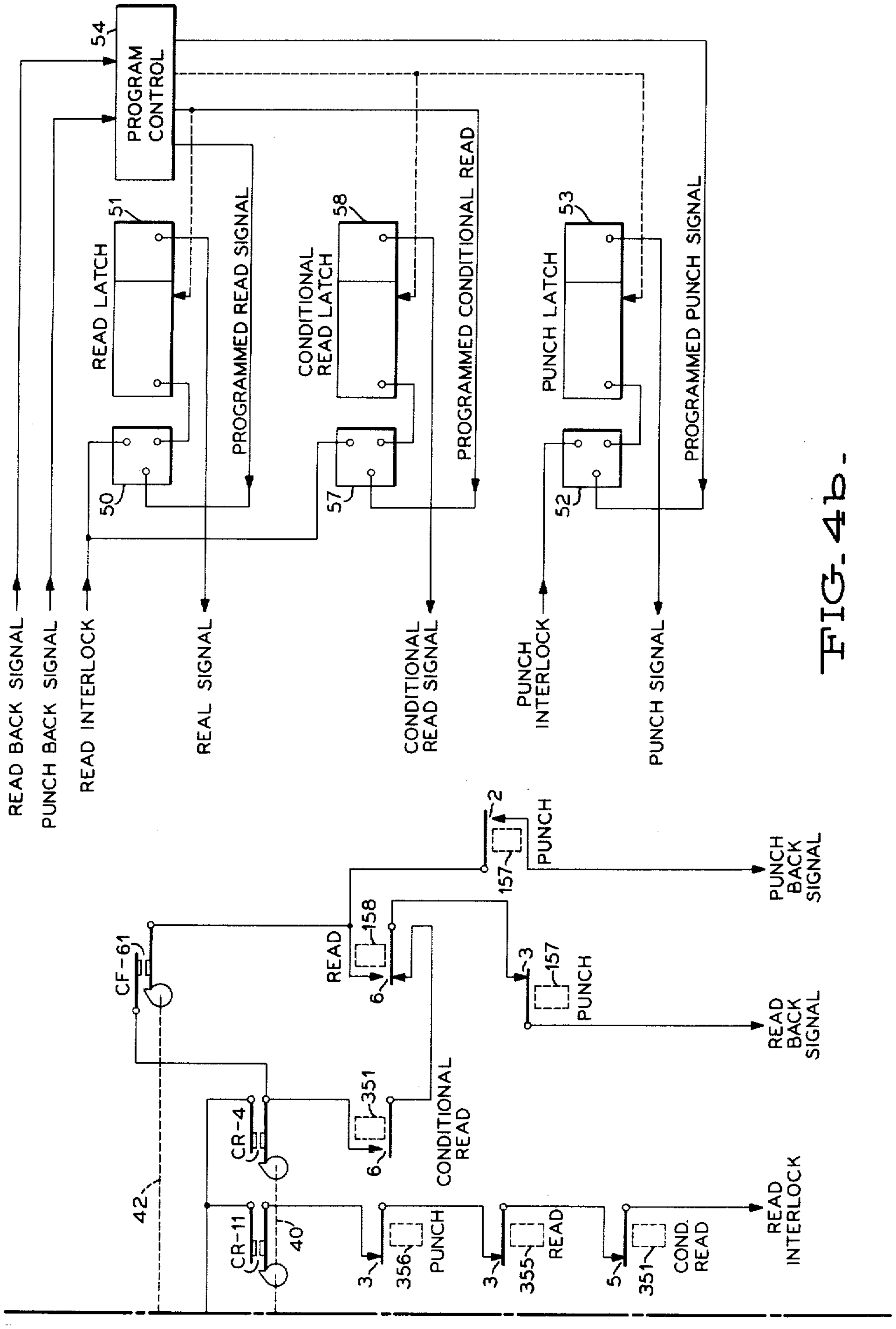

FIGS. 4*a* and 4*b* when placed in a side-by-side relationship form the principal circuits for the read-punch controls.

Attention will be given now to the forms of tubes and diode circuits shown diagrammatically in FIGS. 4*a* and 4*b*. In FIG. 6 there is shown a gate tube 60 that utilizes a cathode follower principle of operation. The gating stage is seen to comprise the triode tube 60 in which the grid 61 is connected through a resistor 62 with the grid input terminal 63. The plate 64 is connected through a resistor 65 with the plate voltage supply terminal 66. The cathode 67 is directly coupled to the cathode output terminal 68 and with the cathode potential supply terminal 69 through the resistor 70. In the preferred embodiment the plate potential is applied to tube 60 in the form of an interlock signal and the grid potential is applied in the form of a programmed control signal. The coincident application of a grid and plate signal produces a resultant output signal at the cathode output terminal 68.

The diodes 71 and 72 comprise a mixer, otherwise known as a logical "or" circuit. The diode inputs are normally biased negatively. If either one or both of the diode inputs is pulsed positively, the potential at the output junction 73 is raised. Herein the input to diode 71 is supplied from the cathode output terminal 68. The input to diode 72 is the "latch" output signal as will be explained later.

A double inverter amplifier is shown to comprise a twin triode amplifier 75 in which the plate 76 of the first triode is coupled through a parallel connected resistor 77 and capacitor 78 in series with a resistor 79 to the grid 80 of the second triode. The grid 81 of the first triode is connected through resistor 82 to the input terminal 83. The cathodes 84 and 85 have a common ground connection as shown. The grid 80 is connected through resistors 79 and 86 to a grid input terminal 87. The plates 76 and 88 of the first and second triodes, respectively, are connected through the resistors 89 and 90 to the plate potential supply terminal 91. Plate 88 is directly connected to the plate output terminal 92.

The operation of the double inverter amplifier is such that when a positive pulse is applied to the grid input terminal 83, the resulting drop of voltage at the plate 76 is communicated to the grid 80, causing a rise in voltage at the plate 88. Hence, a positive output voltage pulse is available at the output terminal 92. The duration of the output pulse is substantially equal to the duration of the input pulses. The double inverter is adapted for use in conjunction with a cathode follower type of circuit to provide a so-called "latch." When used in this fashion, the unit is turned "on" by a positive pulse applied to the grid input terminal 83, and may be turned "off" or reset by the application of a positive pulse to the grid input terminal 87. This will be explained more fully later.

Another form of cathode follower circuit is seen to comprise the triode 95 in which the grid 96 is connected with the grid input terminal 97 through a resistor 98 in series with a parallel connected resistor 99 and capacitor 100. The grid 96 is biased through a resistor 101 from the bias supply terminal 102. The cathode 103 is directly connected to the cathode output terminal 104 and to the cathode potential supply terminal 105 through resistor 106. The plate 107 is coupled to the plate potential supply terminal 108.

The "latch" unit illustrated in FIG. 6 uses the double inverter amplifier including tube 75, a cathode follower including tube 95, and the "or" switch combination of diodes 71 and 72. A latch unit of this type is disclosed in the U.S. Patent to Ernest S. Hughes, Jr., No. 2,628,309, issued February 10, 1953. In the normal "off" condition of the "latch," the left-hand section of the double inverter 75 is cut off and the right-hand section thereof is conducting. The application of a positive pulse to the input of diode 71 causes a positive pulse to be applied to the grid 81, thereby turning the "latch" unit "on." The positive output potential at terminal 92 is fed through the cathode follower 95 and produces a positive potential signal at the output terminal 104. The positive output signal at terminal 104 is coupled through the diode 72, thereby maintaining the latch unit "on." The application of a positive pulse to the grid input terminal 87 turns will restore the "latch" unit to an "off" condition. FIG. 7 illustrates a simplified showing in block diagram form of the circuitry shown in FIG. 6.

Figure 5A:
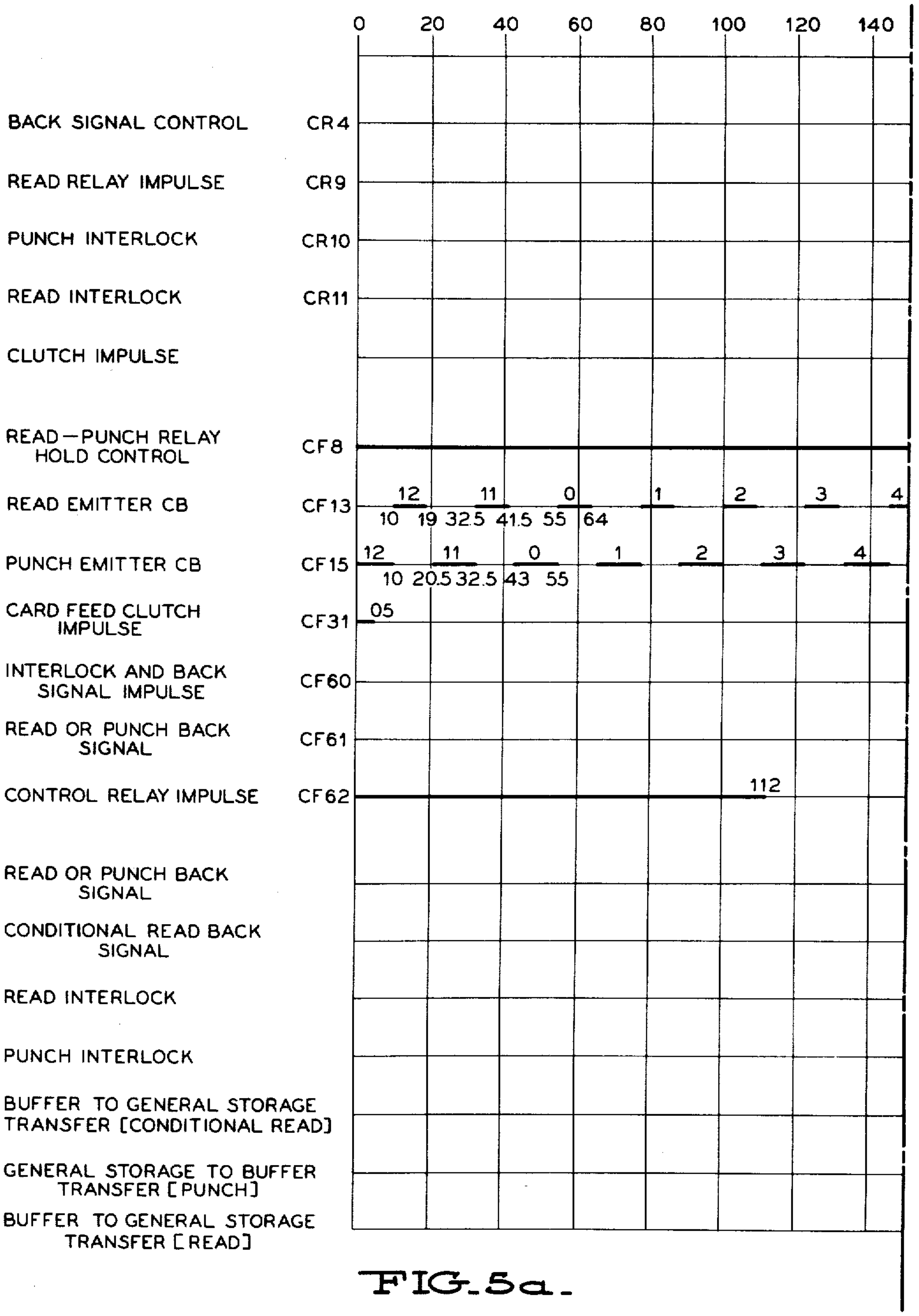
Figure 5B:
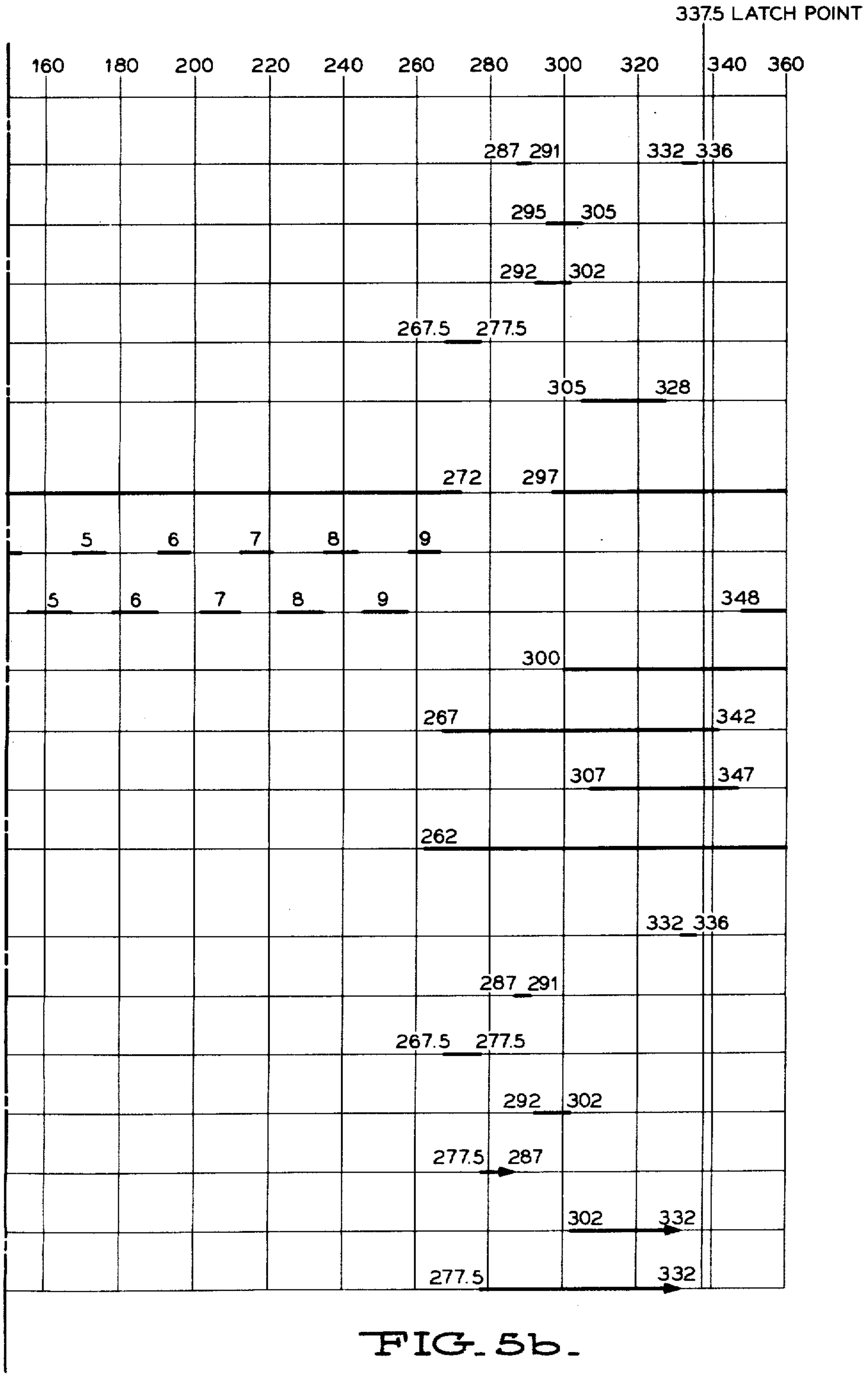

As will be specifically referred to in the disclosure of the electrical circuits, the input-output machine is provided with CR cam contacts which are continually opening and closing during each cycle of operation of the machine, and CF cam contacts which open and close only during card feeding operations of the machine. The cams which operate the CR contacts may be driven by any suitable continually rotated shaft and herein indicated as 40 which is rotated one revolution for each cycle of the input-output machine by the motor 41. The CF cam contacts are operated during each card feeding operation of the input-output machine. The function of the CR cams is to coordinate the operation of the continuously running parts of the input-output device with the card feed and transporting mechanism. Wherein the ensuing description of the preferred embodiment is based on the CR cams having a single set of lobes, it will be apparent that a plurality of sets of lobes could be used satisfactorily on the CR cams to accomplish engagement of the CF mechanism at various points within the continuously operating cycles to enable a more efficient application of the input-output device. The shaft herein indicated as 42 for the CF cams is coupled through the one revolution CF clutch 43 to the motor 41. The one revolution CF clutch 43 is not described in detail since it is well known. The CF clutch 43 serves to couple shaft 42 with motor 41 for driving the shaft through one revolution for each clutch engagement. The timings for the CR and CF cam contacts are indicated by the timing chart of FIGS. 5*a* and 5*b*.

The control signal outputs for the input-output device are identified on FIG. 4 as the read interlock, the punch interlock, the read back-signal and the punch back-signal. The control signal inputs for the input-output device are identified as the read signal, punch signal, and conditional read signal. The read interlock signal furnishes a plate potential to the gate tube 5 for the read *op* (operation latch 51 in the high-speed data processing machine. The function of the read interlock signal is to indicate to the programming section of the high-speed data processing machine that the input-output device is cyclically positioned and conditioned to accept a read or conditional read signal. The punch interlock signal furnishes a plate potential to the gate tube 50 for the read *op* (operation) in the high-speed data processing machine. The function of the punch interlock signal is to indicate to the programming section of the data processing machine that the input-output device is cyclically positioned and conditioned to accept a punch signal.

Following the transmission of either interlock signals, the input-output will receive a read, a conditional read, or a punch signal according to the operation to be performed. The received control signal is followed by an allowance in time to effect data transfers within the storage means of the high-speed data processing machine and then the transmission of the appropriate read or punch back-signal from the input-output device to the program control 54 of the data processing machine. The function of the back-signal is to indicate a control signal has been received; there has been ample time allowed to effect a data transfer within the data processing machine; the input-output device is conditioned to effect the selected operation; and to release the program control 54 of the data processing machine to perform other processing operations while the relatively slow operating input-output device is performing the selected operation.

*Read Control and Operation*

To illustrate the operation of the read controls, we may assume it is desirable to perform a read operation. The program control 54 of the data processing machine will send a signal to the grid of the gate tube 50 for the read latch 51. With reference to FIGS. 4 and 5, when the continually running shaft 40 of the input-output device is passing through the 267.5° part of the machine cycle, the read interlock signal couples a potential to the plate of the gate tube 50. The circuit is through the contacts CF–60, the contacts CR–11, and the normally closed relay points 356–3, 355–3, and 351–5 to the plate of tube 50. The concurrent application of potentials to the grid and plate of tube 50 serves to turn on the read latch 51 which in turn creates a read signal. The read signal directs the operations of transferring data from the read buffer section to the general storage section of the magnetic drum, the erasing of the read buffer section, initiation of a card feed cycle, and the read-in of new data from the second card to the read buffer section. Herein the read signal serves to initiate the card feed cycle for the read-in of new data by completing the circuit for relay 355 through the contacts CF–62 and normally closed relay points 351–4.

The energization of relay 355 interrupts the read interlock circuit by opening relay points 355–3 and the punch interlock circuit by opening relay points 355–2 thereby preventing a subsequent read or punch interlocking signal until after the read operation has been performed. The energization of relay 355 closes the relay points 355–4 conditioning the circuit for relay 158. The pick coil of relay 158 will be energized with a plus potential from 295° to 305° of the input-output device under control of the contacts CR–9 and through the now closed relay points 355–4 and the normally closed relay points 351–2. The hold coil for relay 158 will remain energized through its contact points 158–1 under control of the contacts CF–8.

Relay 158 in an energized condition closes the relay points 158–2 so that the clutch impulse at 305° to 328° under control of contacts CR–12 and CF–31 will cause the CF clutch magnet **43*a* to be energized. The CF clutch 43 will mechanically latch at the 337.5° point thereby coupling shaft 42 with motor 41 so as to drive the card feed mechanism of the input-output device through one cycle. The energization of relay 158 transfers the relay points 158–6 so that from 332° to 336° a circuit for the read back-signal is completed through contacts CF–60, CR–4 and CF–61, the transferred relay points 158–6 and the normally closed relay points 157–3. The read back-signal is coupled to the program control 54 and releases the program section of the high-speed data processing machine to other program steps that may be performed while the card reading operation of the input-output device is taking place at a relatively slower speed. Also, relay 158 in an energized condition and through the relay points 158–4 and under control of contacts CF–13 couples a plus potential to the read translator 55** for translating the data sensed from the record card into codal representations for storage in the read buffer section of the drum storage device. The details for the data translating operation are described in the application for Data Transfer Apparatus, Serial No. 556,598, filed December 30, 1955.

Recapitulating, it has been shown how a read control operation is initiated and effected. Once a read operation is initiated, the input-output device will continue through one cycle returning to the 337.5° latch point where the card feed mechanism will remain until a subsequent card feed cycle is initiated, unless another card feed cycle has already been established. It can be pointed out that successively occurring card feed cycles might be effected so that the card feeding mechanism may be continuously operating through a plurality of cycles.

*Punch Control and Operation*

We may now assume that is desirable to perform a punch operation. The program control 54 of the data processing machine will send a signal to the grid of the gate tube 52 for the punch latch 53. When the continually running shaft 40 of the input-output device is passing through the 292° to 302° part of the machine cycle, the punch interlock signal couples a potential to the plate of the gate tube 52. The circuit is through the contacts CF–60, the contacts CR–10, and the normally closed relay points 356–2 and 355–2 to the plate of tube 52. The concurrent application of potentials to the grid and plate of tube 52 serves to turn on the punch latch 53 which in turn creates a punch signal. The punch signal directs the operations of erasing the punch buffer storage section of the drum, the transfer of data from general storage to punch buffer storage, and initiates a card feed cycle wherein the data stored in the punch buffer is punched into the record cards. Herein the punch signal serves to initiate the card feed cycle by completing the circuit for relay 356 through the contacts CF–62.

The energization of relay 356 interrupts the read interlock circuit by opening relay points 356–3 and the punch interlock circuit by opening relay points 356–2 thereby preventing a subsequent read or punch interlock signal until after the punch operation has been performed. The energization of relay 356 closes the relay points 356–1 and 356–4 conditioning the circuits for relay 157 and the CF clutch magnet 43*a*. The pick coil of relay 157 will be energized with a plus potential from 305° to 328° of the input-output device cycle through the contacts CF–31, under control of the contacts CR–12 and through the now closed relay points 356–1 and 356–4. The CF clutch 43*a* will also be energized at this time. The CF clutch 43 will mechanically latch at the 337.5° point thereby coupling shaft 42 with motor 41 so as to drive the card feed mechanism through one cycle. The hold coil for relay 157 will remain energized through its contact points 157–1 under control of the contacts CF–8.

The energization of relay 157 closes the relay points 157–2 so that from 332° to 336° a circuit for the punch back-signal is completed through contacts CF–60, CR–4 and CF–61, and the relay points 157–2. The punch back-signal is coupled to the program control 54 and releases the program section of the data processing machine so that other programmed steps may be performed while the card punching operation of the input-output device is taking place at a relatively slower speed.

With relay 157 in an energized condition and through the relay points 157–4 and under control of contacts CF–15 a plus potential is coupled to the punch translator 56 for translating the codal representations of the data sensed from the punch buffer into codal signals for punching the data into the record card as it is transported through the punch station of the input-output device. The details for this type of data translating operation are described in the application for Data Transfer Apparatus, Serial No. 556,598, filed December 30, 1955.

Summarizing, it has been shown how a punch control operation is started and effected. Once a punch operation is started, the card transport mechanism of the input-output device will continue through one cycle and upon returning to the 337.5° latch point will be rendered inoperative, unless the subsequent card feed cycle has already been established.

*Conditional Read Control and Operation*

A feature of the invention is the provision of the conditional read control. This control enables a read and punch operation to be performed concurrently by the input-output device thereby increasing the over-all speed of the input and output data transfer operations. This is a significant achievement for machines commonly referred to in the art as single address machines. In other words, machines which normally perform a single operation at a time. The advantage of this arrangement will become apparent as the description proceeds.

When a conditional read operation is desired, the program control 54 will send a signal to the grid of the gate tube 57. When the continually running shaft 40 of the input-output device is passing through the 267.5° to 277.5° part of the machine cycle, the read interlock signal couples a potential to the plate of the gate tube 57. The circuit is through the contacts CF–60, the contacts CR–11, and the normally closed relay points 356–3, 355–3 and 351–5 to the plate of tube 57. The concurrent application of potentials to the grid and plate of tube 57 serves to turn on the conditional read latch 58 which in turn creates a conditional read signal that completes the circuit for relay 351 through the contacts CF–62. The energization of relay 351 interrupts the read interlock circuit by opening the relay points 351–5. This prevents a subsequent read or conditional read signal until the read interlock circuit has been restored to normal as will become apparent later.

The energization of relay 351 closes the relay points 351–6 conditioning the read back-signal circuit. As indicated by the timing chart of FIGS. 5*a* and 5*b*, the conditional read back-signal occurs from 287° to 291° under control of contacts CF–60, CR–4, the relay points 351–6 now closed, the normally closed relay points 158–6 and 157–3. The conditional read back-signal is coupled to the program control 54 to release the high-speed data processing machine for the performing of other programmed operations.

The time between the read interlock signal and the conditional read back-signal is 9.5° of the input-output machine cycle. The purpose for this interval is to permit time for the transfer of data stored in the read buffer during the preceding read cycle to the general storage section of the magnetic drum. This transfer of data occurs within one revolution of the drum storage device. In the preferred embodiment the drum rotates at a speed of 12,500 r.p.m. The time required for one revolution is 4.8 milliseconds. The maximum speed of the input-output device is 155 cards per minute which is equal to (155×360°)55,800° per minute or 1.072 milliseconds per machine degree. Thus, it should be apparent that the 9.5° of input-output machine time is ample to enable a data transfer from the read buffer to general storage.

The data when stored in general storage is immediately addressable for selective data processing operations. This data may be utilized in producing the results which are to be punched into the record card passing through the punch station during the next card feed cycle.

The energization of relay 351 also transfers the relay points 351–2 conditioning the circuit for the pick coil of relay 158. An examination of the circuitry will indicate that the CF clutch 43*a* can now only be energized through the relay points 356–1, which are controlled by the punch relay 356. Consequently, after a conditional read signal for the input-output device must be a punch signal.

With the circuitry conditioned as described above, the ensuing card feed cycle of the input-output machine must be initiated by a punch signal at which time the program control 54 will send a signal to the grid of tube 52. When the continually running shaft 40 of the input-output device is passing through the 292° to 302° part of the machine cycle, the punch interlock signal couples a potential to the plate of the gate tube 52. The circuit is through the contacts CF–60, the contacts CR–10, and the normally closed relay points 356–2 and 355–2 to the plate of tube 52. The concurrent application of potentials to the grid and plate of tube 52 serves to turn on the punch latch 53 which in turn creates the punch signal that completes the circuit for relay 356 through the contacts CF–62.

The energization of relay 356 interrupts the punch intrlock circuit by opening the relay points 356–2. The energization of relay 356 also closes the relay points 356–1 and 356–4 conditioning the circuits for relay 157 and the CF clutch magnet 43*a*. The pick coil of relays 157 and 158 will be energized with a plus potential from 305° to 328° through the contacts CF–31, under control of the contacts CR–12 and through the now closed relay points 356–1, 356–4, and the transferred relay points 351–2. The CF clutch 43*a* will also be energized at this time. The CF clutch 43 will mechanically latch at the 337.5° point coupling shaft 42 with motor 41 so as to drive the card feed through one cycle. The hold coils for relays 157 and 158 will remain energized through their respective relay points 157–1 and 158–1 under control of the contacts CF–8.

The energization of relay 157 closes the relay points 157–2 so that from 332° to 336° a circuit for the punch back-signal is completed through contacts CF–60, CR–4 and CF–61, and the relay points 157–2. The punch back-signal is coupled to the program control 54 and releases the program section of the data processing machine so that other programmed steps may be performed while the card feed cycle of the input-output device is operative.

With relay 157 in an energized condition and through the relay points 157–4 and under control of contacts CF–15 a plus potential is coupled to the punch translator 56 for translating the codal representations of the data sensed from the punch buffer into codal signals for punching the data into the record card being transported through the punch station of the input-output device. Concurrently, with relay 158 in an energized condition and through the relay points 158–4 and under control of contacts CF–13, a plus potential is coupled to the read translator 55 for translating the data sensed from the record card being transported through the second read station into codal representations for storage in the read buffer section of the drum storage device.

Summarizing, there has been described the manner in which the controls operate to accomplish a conditional read operation wherein the read buffer is emptied of data by its transfer to general storage and the circuitry conditioned to receive a subsequently occurring punch signal whereby both a read and a punch operation are effected concurrently. Once a card feed cycle has been initiated the card transporting mechanism will continue to operate through one cycle to its logical conclusion at the 337.5° point. Observation of the timing chart of FIGS. 5*a* and 5*b* will indicate that successively occurring card feed cycles can be initiated while the input-output device is nearing the 337.5° point. Under these conditions the input-output device can be rendered continually operable at its 155 card per minute rate to effect concurrent read and punch operations.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing fom the spirit of the invention. It is the intention, therefore, to be limited only as indicated by the scope of the following claims.

What is claimed is:

1. In a data processing system, a data storage device for storing data magnetically and including a buffer storage section and a general storage section with recording and reading means associated with each of the sections to transcribe data therein and read data therefrom, a data source, a first data transfer link connecting said data source with the recording means for said buffer storage section, a second data transfer link connecting the reading means for said buffer storage section with the recording means for said general storage section, a third data transfer link connecting the reading means for the general storage section with the recording means for said buffer storage section, a data recording device, a fourth data transfer link connecting the reading means for said buffer storage section with the data recording device, and data transfer control means coupled with each of said transfer links to selectively control individual data transfers from the buffer storage section to the general storage section, from the data source to the general storage section by way of the buffer storage section, from the general storage section to the recording device by way of the buffer storage section, and concurrent data transfers from the data source to the buffer storage section and from the general storage section to the recording device, each transfer by way of the buffer storage section.

2. In a data processing system, the combination, comprising a cyclically operable data storage device for storing data magnetically and including an input buffer storage section, an output buffer storage section, and a general storage section with recording and reading means associated with each of the sections to respectively transcribe data therein and read data therefrom; a data source; a first data transfer link connecting the data source with the recording means for the input buffer section; a second data transfer link connecting the reading means for the input buffer section with the recording means for the general storage section; a third data transfer link connecting the reading means for the general storage section with the recording means for the output buffer section; a data recording device; a fourth data transfer link connecting the reading means for the output buffer section with the data recording device; a first data transfer control means coupled with said first and second data transfer links and selectively operable to effect data transfers from said input buffer section to the general storage section and from said data source to said input buffer section; a second data transfer control means coupled with said third and fourth data transfer links and selectively operable to effect data transfers from said general storage section to the output buffer section and from the output buffer section to said data recording device; and a third data transfer control means coupled with all of said data transfer links and operable to effect a data transfer from said input buffer section to the general storage section and subsequently operable to effect concurrent data transfers from said data source to said input buffer section and from said general storage section to said data recording device by way of the output buffer.

3. In a data processing system as described in claim 2, characterized by the provision of interlock means responsive to any of said data transfer control means in an operable state to render all of said data transfer control means ineffective until the data transfer operation controlled by the operable data transfer control has been established.

4. In a data processing system as described in claim 3 characterized by the provision of signaling means controlled by each of said data transfer control means for signaling when a data transfer control condition has been established.

5. In a data processing system having a data storage device with an intermediate storage section and a general storage section, a data reading device, a data recording device, a first data transfer link coupling said data reading devices with said intermediate storage section, a second data transfer link coupling said intermediate storage section with said data recording devices, and a third data transfer link coupling said intermediate storage section and said general storage section, data transfer control apparatus comprising a program means capable of producing selective control stimuli, a first data transfer control means linked with said data transfer links and said program means and responsive to selective control stimuli to effect sequentially data transfers from said intermediate storage section to said general storage section and from said data reading device to said intermediate storage section, a second data transfer control means linked with said data transfer links and said program means and responsive to selective control stimuli to effect sequentially data transfers from said general storage section to said intermediate storage section and from said intermediate storage section to said data recording device, a third data transfer control means linked with said data transfer links and said program means and responsive to selective control stimuli to effect data transfers from said intermediate storage section to said general storage section, and means controlled by said third data transfer control means in an operable state to render said first data transfer control means nonresponsive to the ensuing control stimulus and to effect concurrently data transfers from said data reading device to said intermediate storage section and from said general storage section to said intermediate storage section and therefrom to said data recording device in response to the ensuing control stimulus.

6. In a data processing system as described in claim 5 characterized by the provision of interlock means responsive to any one of said data transfer control means in an operable state to render all of said data transfer control controlled by the operable data transfer control means has been established.

7. In a data processing system as described in claim 6 characterized by the provision of signaling means controlled by each of said data transfer control means and coupled with said program means for signaling when a data transfer control operation has been established.

8. In a data processing system, a cyclically operable data storage device for storing data magnetically and including an input buffer storage section, an output buffer storage section, and a general storage section with recording and reading means associated with each of the sections to respectively transcribe data therein and read data therefrom; a data source; a first data transfer link connecting the data source with the recording means for the input buffer section; a second data transfer link connecting the reading means for the input buffer section with the recording means for the general storage section; a third data transfer link connecting the reading means for the general storage section with the recording means for the output buffer section; a data recording device; a fourth data transfer link connecting the reading means for the output buffer section with the data recording device; data transfer control apparatus comprising a program device capable of producing selective control stimuli; a first electromagnetic data transfer control device linked with said data transfer links and said program device and responsive to selective control stimuli to effect sequentially data transfers from said input buffer storage section to said general storage section and from said data source to said input buffer storage section; a second electromagnetic data transfer control device linked with said data transfer links and said program device and responsive to selective control stimuli to effect sequentially data transfers from said general storage section to said output buffer storage section and from said output buffer storage section to said data recording device; a third electromagnetic data transfer control device linked with said data transfer links and said program device and responsive to selective control stimuli to effect data transfers from said input buffer storage section to said general storage section; and connections controlled by said third electromagnetic data transfer control devices in an operable state to render said first electromagnetic transfer control device nonresponsive to the ensuing control stimulus and to effect concurrently a data transfer from said data source to said input buffer storage section, and a data transfer from said general storage section to said output buffer storage section and therefrom to said data recording device in response to the ensuing control stimulus when applied to said second electromagnetic data transfer control device.

9. In a data processing system as described in claim 8 characterized by the provision of interlock connections controlled by any one of said electromagnetic data transfer controls in an operable state to render all of said electromagnetic data transfer control devices ineffective until after the data transfer operation controlled by the operable electromagnetic data transfer control device has been established.

10. In a data processing system as described in claim 9 characterized by the provision of signaling means controlled by each of said electromagnetic data transfer control devices and coupled with said program device for signaling when a data transfer control operation has been established.

References Cited in the file of this patent

UNITED STATES PATENTS

| | | |
|---|---|---|
| 2,521,623 | Arndt et al. | Sept. 5, 1950 |
| 2,701,095 | Stibitz | Feb. 1, 1955 |
| 2,739,299 | Burkhart | Mar. 20, 1956 |
| 2,856,595 | Selmer | Oct. 14, 1958 |

FOREIGN PATENTS

| | | |
|---|---|---|
| 749,836 | Great Britain | June 6, 1956 |

OTHER REFERENCES

"Gamma 60," sales brochure.

UNITED STATES PATENT OFFICE
CERTIFICATE OF CORRECTION

Patent No. 3,029,412 April 10, 1962

Carl D. Southard

It is hereby certified that error appears in the above numbered patent requiring correction and that the said Letters Patent should read as corrected below.

Column 3, line 34, for "registrater" read -- register --; column 7, line 70, for "tube 5" read -- tube 50 --; column 8, line 2, for "tube 50 for the read op (operation)" read -- tube 52 for the punch op latch 53 --; column 8, line 32, for "shaff" read -- shaft --; line 53, for "interlocking" read -- interlock --; column 11, line 24, for "intrlock" read -- interlock --; column 12, line 9, for "fom" read -- from --; column 13, line 46, after "control" insert -- means ineffective until after the data transfer operation --.

Signed and sealed this 11th day of December 1962.

;EAL)
ttest:

NEST W. SWIDER
testing Officer

DAVID L. LADD
Commissioner of Patents